Figure 1:
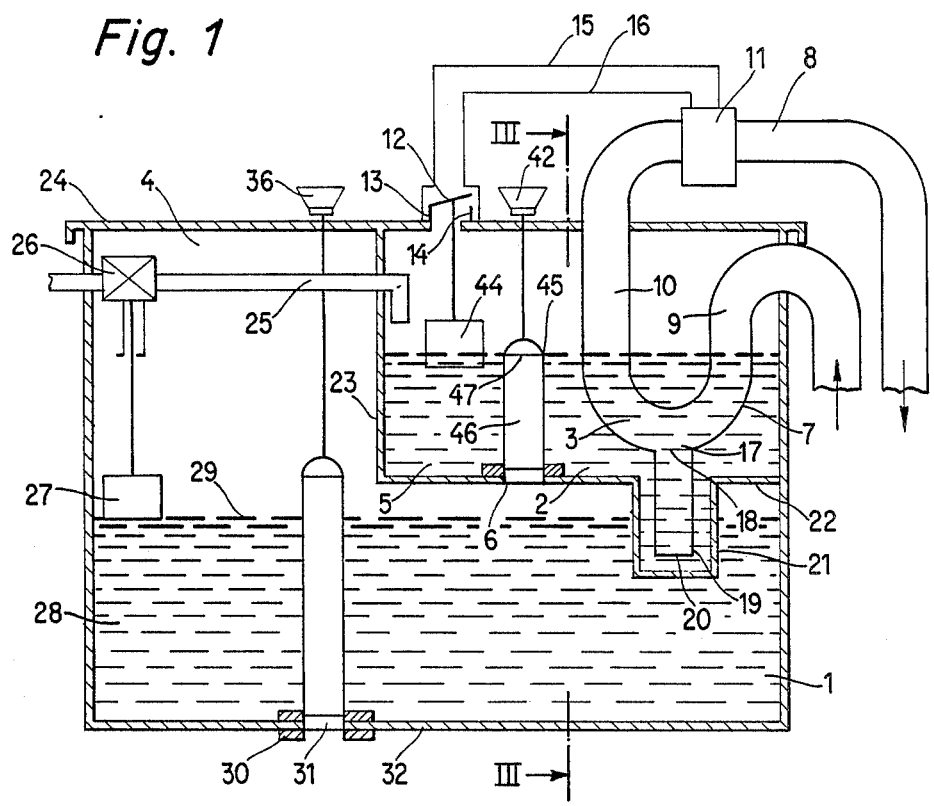

United States Patent [19]

Menge

[11] Patent Number: 4,800,596
[45] Date of Patent: Jan. 31, 1989

[54] VENTILATED TOILET

[76] Inventor: Heinrich Menge, Eissendorfer Pferdeweg 145, D-2100 Hamburg 90, Fed. Rep. of Germany

[21] Appl. No.: 901,261

[22] Filed: Jul. 25, 1986

[30] Foreign Application Priority Data

Jul. 25, 1985 [DE] Fed. Rep. of Germany ....... 3526587
Sep. 27, 1985 [DE] Fed. Rep. of Germany ....... 3534494

[51] Int. Cl.⁴ .............................................. E03D 9/052
[52] U.S. Cl. ........................................... 4/348; 4/351; 4/364; 4/213; 4/216; 137/247.27; 137/253
[58] Field of Search ............... 137/247.27, 253; 4/328, 4/347, 348, 349, 350, 351, 363, 364, 211, 213, 216, 214

[56] References Cited

U.S. PATENT DOCUMENTS

| | | | |
|---|---|---|---|
| 415,869 | 11/1889 | Kelly | 137/247.27 X |
| 417,100 | 12/1889 | Shone | 137/247.27 X |
| 688,234 | 12/1901 | Brown | 4/213 |
| 871,836 | 11/1907 | Wade | 137/247.27 |
| 907,211 | 12/1908 | Williams | 137/247.27 |
| 1,093,601 | 4/1914 | Blichmann | 137/247.27 X |
| 2,256,758 | 9/1941 | Groeniger | 137/247.27 |
| 2,603,797 | 7/1952 | Baither | 4/214 |
| 2,721,065 | 10/1955 | Ingram | 137/253 X |
| 2,985,890 | 5/1961 | Baither | 4/213 |
| 3,126,906 | 3/1964 | Touzaliu | 137/253 |
| 3,961,641 | 6/1976 | Tyson | 137/253 X |
| 4,358,864 | 11/1982 | Medrano | 4/364 X |

Primary Examiner—John Rivell
Attorney, Agent, or Firm—Peter K. Kontler

[57] ABSTRACT

A toilet has a toilet bowl and a flushing tank which accommodates a supply of flushing liquid for the bowl. The bowl, which discharges into a waste line, is connected to the flushing tank by a flushing pipe. A second pipe for evacuating odors from the bowl likewise leads from the bowl to the tank. This evacuating pipe has an open end in the bottom of the bowl and a second end in the tank. An air duct hooked into the waste line also extends into the tank and can be caused to communicate with the evacuating pipe when the toilet is in use. The air duct is provided with a blower which functions to convey odors from the bowl to the waste line via the evacuating pipe, flushing tank and air duct. A liquid seal cuts off communication between the air duct and evacuating pipe when the toilet is not in use to prevent backflow of odors from the waste line to the bowl. The liquid seal is located in the flushing tank and is established using the flushing liquid accommodated by the same.

47 Claims, 6 Drawing Sheets

VENTILATED TOILET

This application contains subject matter similar to that of application Ser. No. 877,292 filed June 23, 1986 by Heinrich Menge for Water Closet.

The invention relates to an apparatus for regulating the flow of at least one gas stream which flows through at least one pipe adapted to be sealed by a liquid seal and extending into the liquid seal with a discharge end and an inlet end.

It is known to employ such apparatus, for example, as odor barriers. In such capacity, they normally seal a foul smelling gas at one end of the pipe from which no odors should issue. These odor barriers can be fully open. In such condition of the liquid seal, the entire cross-section of the pipe is available for the passage of a gas. Alternatively, the liquid seal is filled. In such condition, no gas can pass through the sealed pipe. It is not possible to regulate the gas stream in such a way that a portion of the gas stream flows in a first direction and a portion of the gas stream flows in another direction, i.e., that one portion can be sealed.

Accordingly, it is an object of the present invention to improve an apparatus of the aforementioned type in such a way that it can enable a gas stream to flow, in its entirety or in part, in one or more directions in accordance with a predetermined selection.

In accordance with the invention, this object is accomplished in that the liquid seal comprises at least one regulatable liquid outlet which is provided in the liquid seal at a level at most as high as that where a connection is provided between the outlet end and the inlet end.

Such controllable liquid outlet renders it possible to discharge from the liquid seal such quantities of liquid that the liquid seal invariably exposes a desired combination of outlet end and inlet end of a pipe. One or more inlet and/or outlet ends can be exposed by the liquid in dependency upon the desired direction of flow of the gas stream to be directed. Such an apparatus exhibits the important advantage of a highly reliable operation because the admission of gas to the outlet end is invariably prevented in a reliable way. Such reliability can be obtained by regulating the inlet and outlet ends of a plurality of pipes.

In accordance with a preferred embodiment of the invention, at least two inlet ends discharge into the liquid seal at different levels. In this manner, and by lowering the level of liquid in the liquid seal, it is possible to connect the outlet end with the one or the other inlet end. The gas stream can then flow in one of two directions or in both directions.

It is further possible to have both inlet ends discharge into the liquid seal at the same level. In this embodiment, both inlet ends are exposed at the same time so that gases flow to the discharge end from both inlet ends.

In accordance with a further embodiment, the liquid outlet is connected with one end of a first leg which is connected with a second leg of a U-shaped looped tubular portion by way of a yoke. The second leg constitutes a liquid outlet the end of which is located at most at the level of a plane determined by the end of the first leg whereas the yoke which is disposed between the two legs is located at the maximum liquid level in the liquid seal which is disposed between the inlet and outlet ends, a sealing element being provided in the looped tubular portion to aerate its internal space by way of its opening.

Such a looped pipe ensures an optimum reliability on actuation of the liquid seal, especially if the sealing element is provided in the yoke. In this manner, the sealing element is disposed at the highest point of the U-shaped tubular portion. At such point, air which is admitted by way of the sealing element acts upon the quantity of liquid that flows through the U-shaped tubular portion for a very short interval of time so that the stream of liquid is interrupted immediately after opening of the sealing element.

Further details of the invention will become apparent from the following detailed description and from the enclosed drawings wherein preferred embodiments of the invention are illustrated by way of example.

Figure 2:
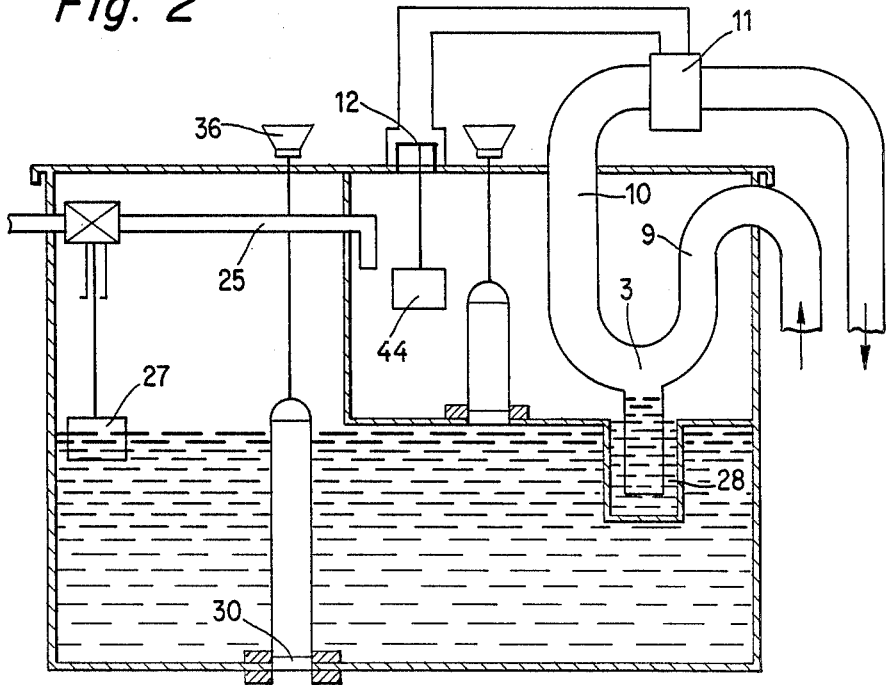
Figure 3:
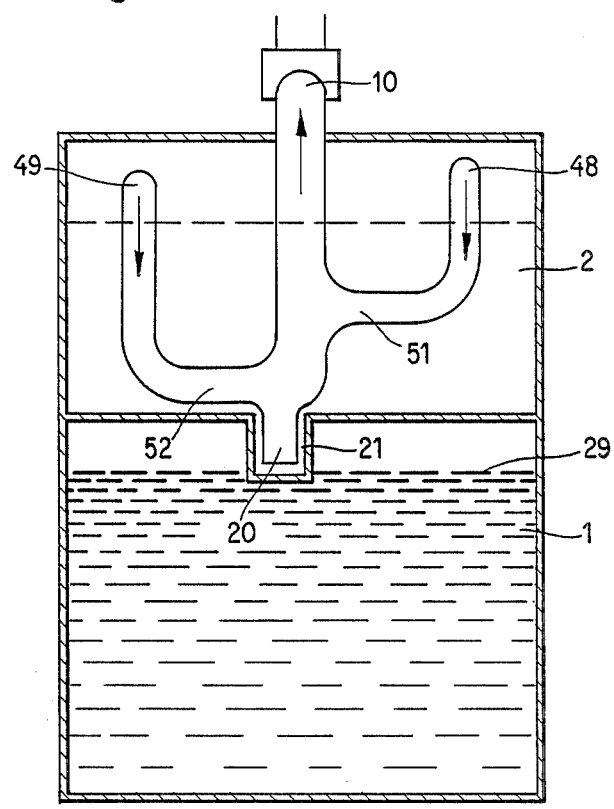
Figure 4:
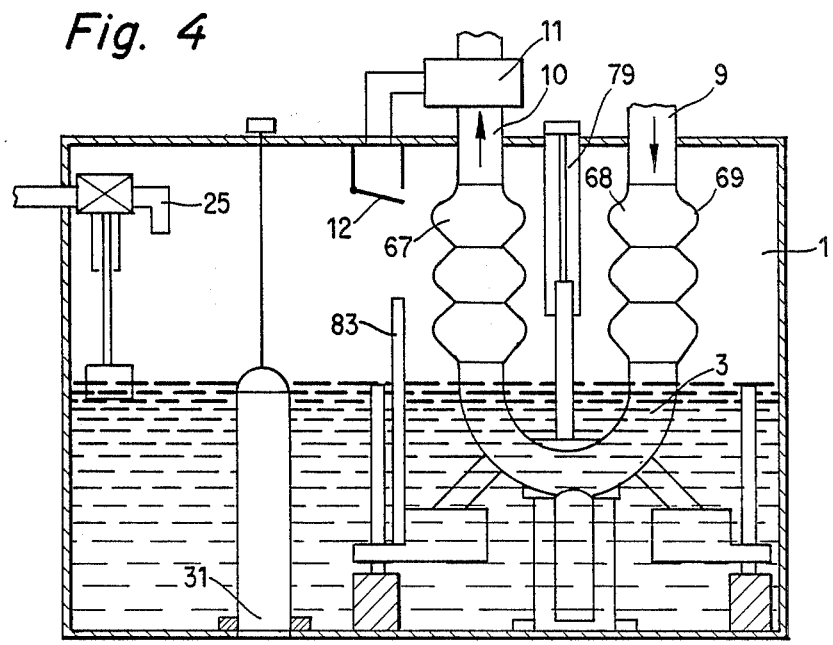
Figure 5:
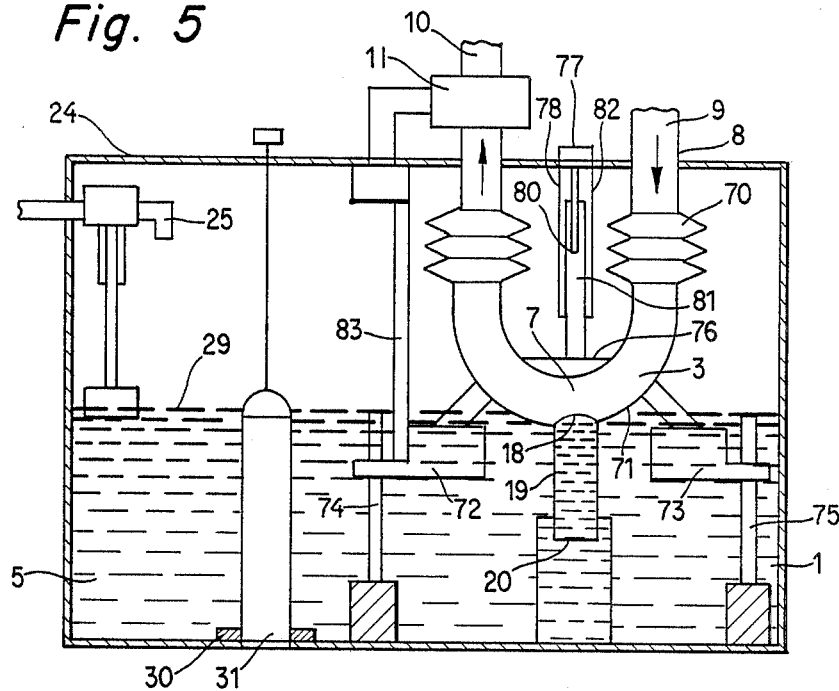
Figure 6:
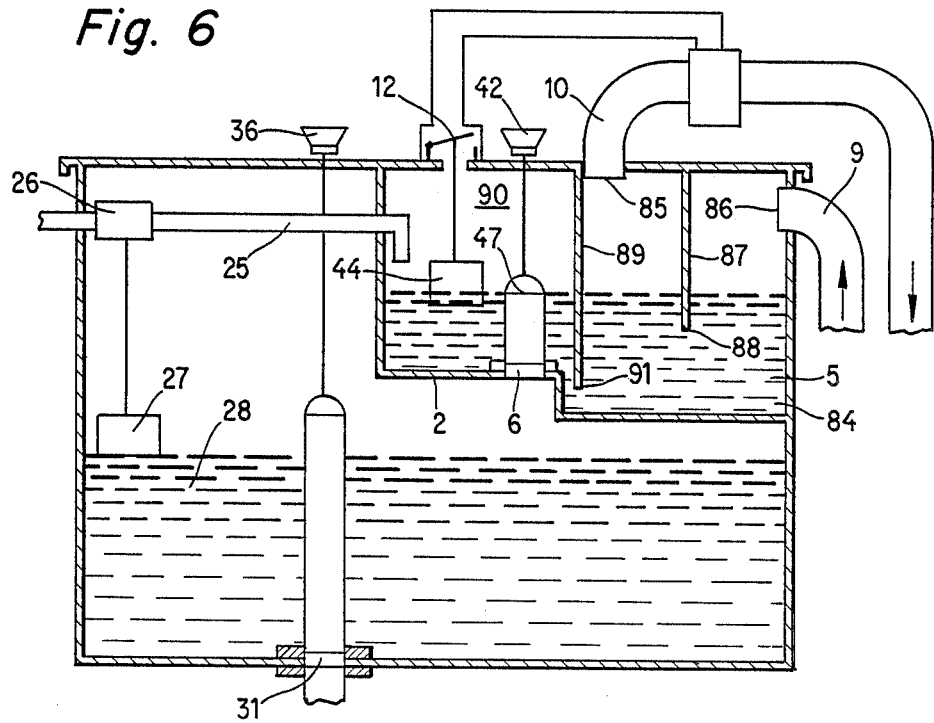
Figure 8:
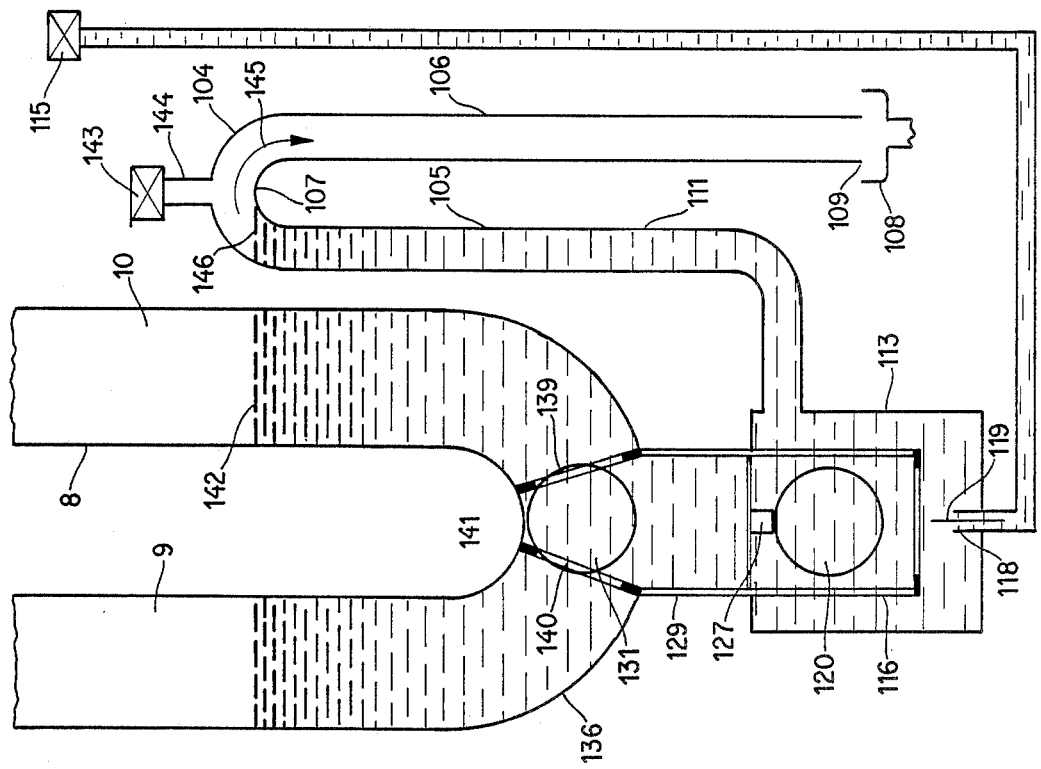
Figure 7:
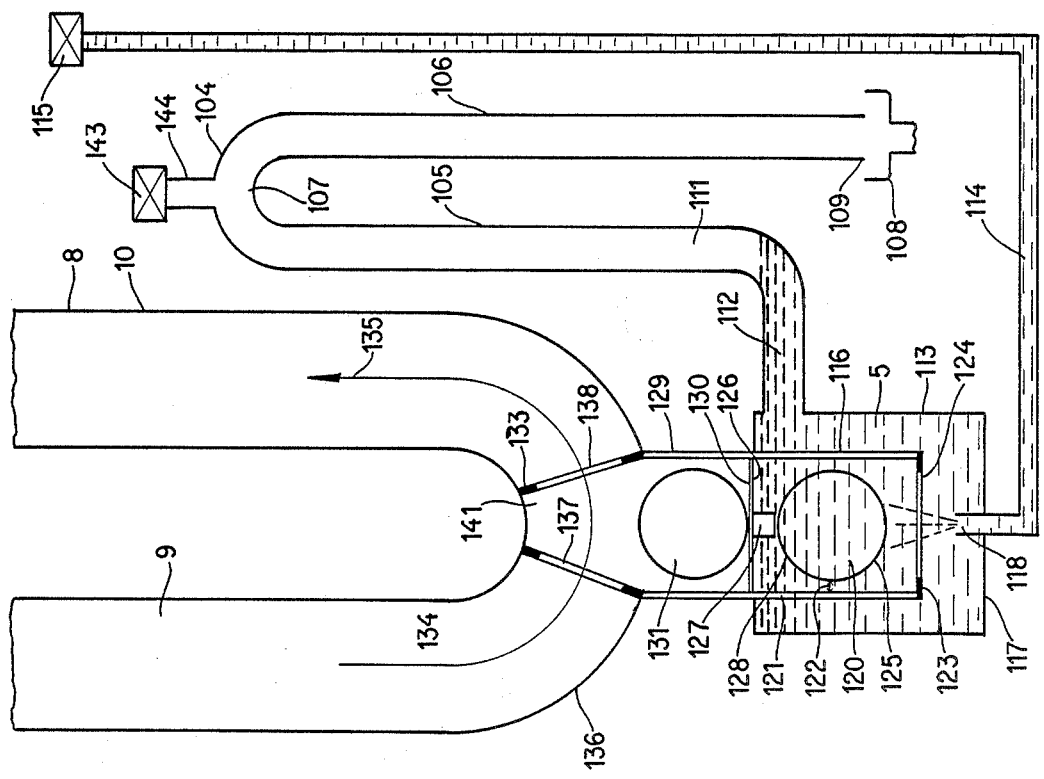
Figure 9:
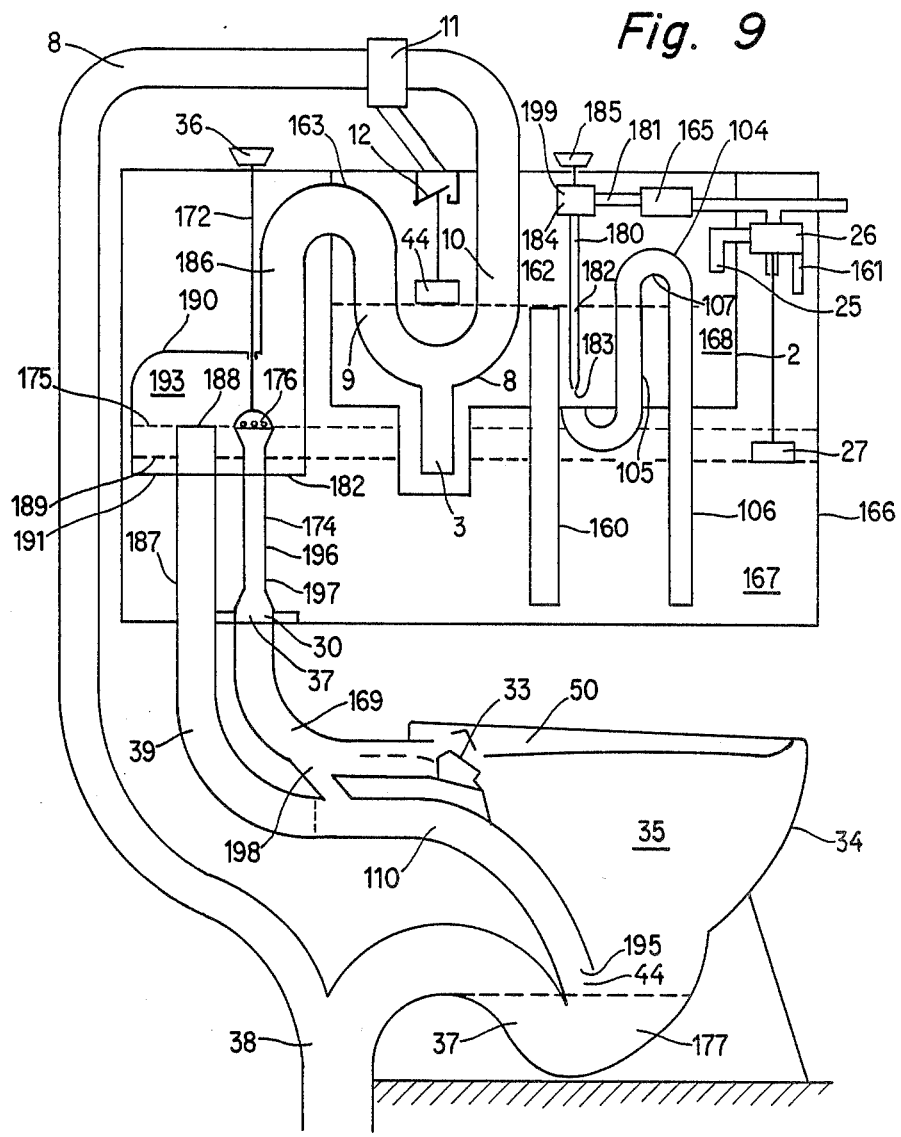
Figure 10:
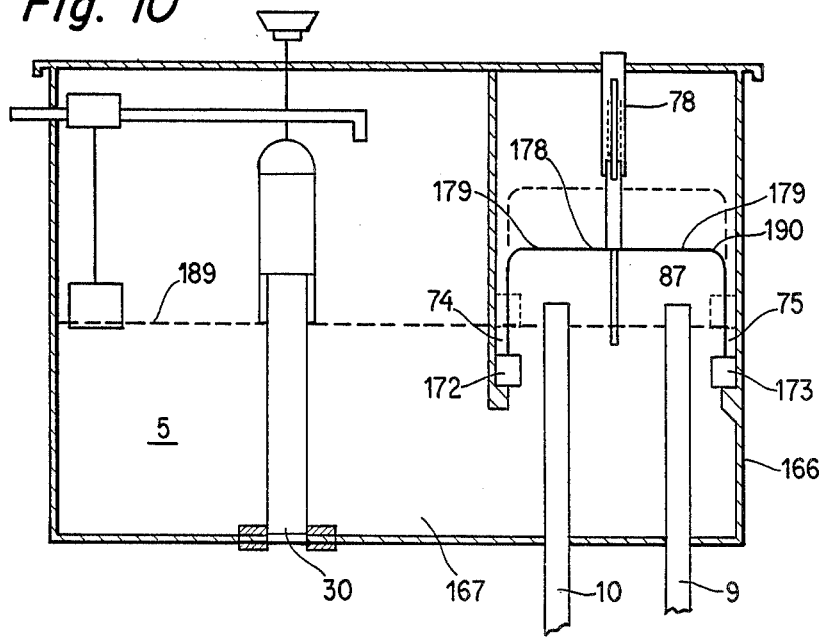
Figure 11:
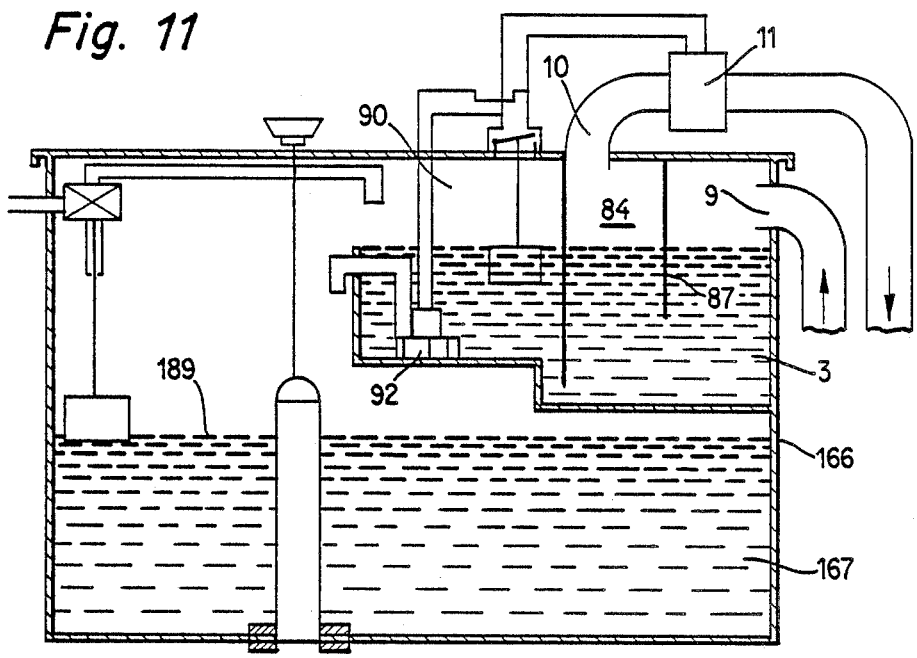
Figure 12:
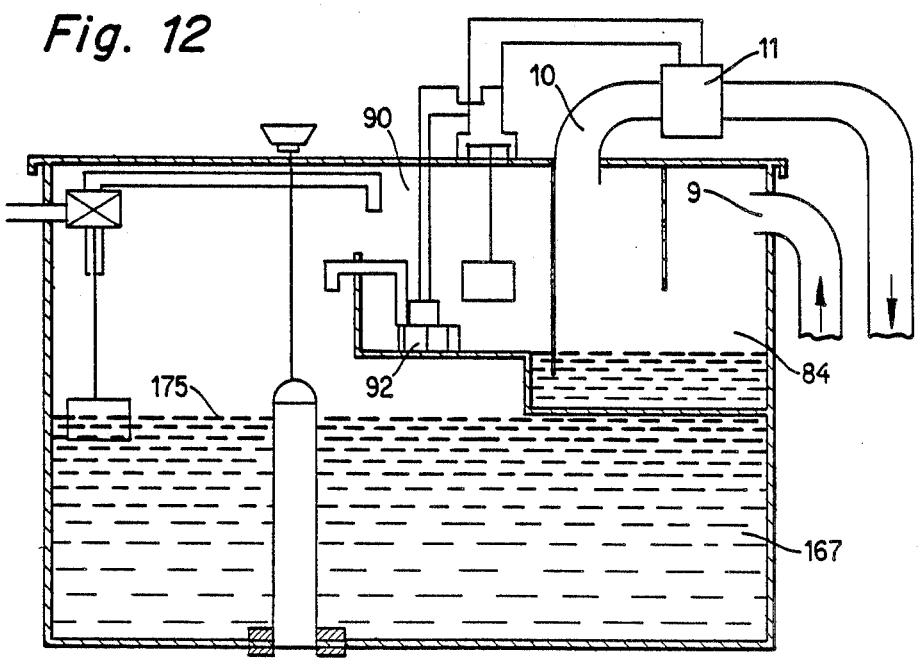

In the drawings;

FIG. 1 is a longitudinal sectional view of an apparatus which comprises a first container and a larger second container with a filled liquid seal, FIG. 2 is similar to FIG. 1 but with the liquid seal empty, FIG. 3 is a cross section along the section line III—III in FIG. 1, FIG. 4 is a longitudinal sectional view of a container with a shiftable liquid seal which is filled, FIG. 5 is similar to FIG. 4 but with the shiftable liquid seal in evacuated condition, FIG. 6 is a longitudinal sectional view of a container with two compartments in filled condition, FIG. 7 is a schematic representation of an apparatus with an emptied liquid seal, FIG. 8 is similar to FIG. 7 but with the liquid seal filled, FIG. 9 is a schematic representation of a toilet bowl with an enlarged flushing tank, FIG. 10 is a longitudinal sectional view of a container with a lowerable bell which constitutes an odor barrier, FIG. 11 is a longitudinal sectional view of a container having an inner container which is shown in filled condition and is divided into two compartments, and FIG. 12 is similar to FIG. 11 but with the inner container in evacuated condition.

The apparatus comprises basically a large container 1, a smaller container 2, and a liquid seal 3. The container 2 is mounted in an upper part 4 of the large container 1 in such a way that a liquid 5 can issue therefrom by its own weight when a valve 6, which normally seals the container 2, is opened.

The liquid seal 3 constitutes an elbow 7 of a pipe 8 and is disposed in the interior of the container 2.

An inlet end 9 and an outlet end 10 of the pipe 8 communicate with the elbow 7. A gas flows in a direction toward the elbow 7 through the inlet end 9, and such gas flows from the elbow through the outlet end 10 in a direction toward a blower 11 which generates a subatmospheric pressure. This blower is operated electrically and is connected to a non-illustrated source of electrical energy in response to closing of a float-operated switch 12 the electric poles 13, 14 of which are connected with the blower 11 by respective conductors 15, 16.

The lowermost portion 17 of the elbow 7 is provided with a liquid outlet 18 by means of which the elbow 7 communicates with the container 2. The liquid outlet 18 is followed, in the direction of flow of liquid 5 from the liquid outlet 18, by a tubular nipple 19 the lower end 20 of which faces away from the liquid outlet and extends into an odor barrier 21 which is provided in a container bottom 22. This container bottom 22 separates the container 2 from the large container 1 in the horizontal direction. It is connected by way of a sidewall 23 with a cover 24 which closes the large container 1. A supply pipe 25 extends into the container 2 through the sidewall 23. The supply pipe 25 feeds liquid 5 into the container 2 from a non-illustrated liquid-supplying main. The admission of liquid 5 is regulated by a float-operated valve 26 which is mounted in the supply pipe 25. This float-operated valve 26 is provided with a float 27 swimming on a body 28 of liquid which is confined in the large container 1.

When the large container 1 is filled, the body 28 of liquid extends to a level 29 the height of which in the interior of the large container 1 is selected in such a way that the entire body of liquid which is confined in the container 2 can be received by the large container 1 without interfering with the outflow of liquid 5 from the container 2.

The large container 1 is provided with a liquid outlet 31 which is sealed by a flushing valve 30. This liquid outlet 31 is provided in a bottom wall 32 of the large container 1 which bottom wall is substantially plane parallel with the cover 24. The outlet 31 can be connected with an inlet 33 which discharges into the internal space 35 of a toilet bowl 34. In such combination, the large container 1 constitutes a flushing tank the cover 24 of which is provided with an actuating knob 36 for the flushing valve 30. The internal space 35 of the toilet bowl 34 is connected with a drain pipe 38 by way of an odor barrier 37. The drain pipe 38 communicates with the outlet end 10 of the liquid seal 3. On the other hand, the inlet end 9 is connected, by way of a pipeline 39, with a hollow body 40 which extends, at least at one side, into the internal space 35 to such an extent that its outlet 41 extends as far as possible into the internal space 35 of the toilet bowl 34 in a direction toward the odor barrier 37. This hollow body 40 renders it possible to withdraw foul smelling gases from the lower part of the internal space 35 immediately above the odor barrier 37.

The liquid seal 3 separates the inlet end 9 from the outlet end 10, and thus prevents the foul smelling gases from flowing out of the drain pipe 38 by way of the outlet end 10, into the inlet end 9 and thence, by way of the pipeline 39 and hollow body 40, into the internal space 35 of the toilet bowl 34.

If foul smelling odors gather in the internal space 35 of the toilet bowl 34 while the toilet is being used, they are drawn by the blower 11 by way of the pipeline 39 in a direction toward the inlet end 9 as soon as the liquid 5 is discharged from the container 2 and hence from the liquid seal 3. For this purpose, the valve 6 is opened by a pull knob 42 prior to using of the toilet so that the liquid 5 can leave the container 2 in a direction into the large container 1. In this manner, not only the contents of the container 2 are evacuated but the contents of the liquid seal 3 are also evacuated by way of the liquid outlet 18. During outflow of liquid 5 from the container 2, its level 45 descends to cause a descent of a float 44 which actuates the float-actuated switch 12 to ensure that the poles 13, 14 are connected to each other. In this manner, the blower 11 is started and draws foul smelling odors from the hollow body 40 and causes them to enter the drain pipe 38.

If the internal space 35 of the toilet bowl 34 is to be flushed, the flushing valve 30 is opened in response to lifting of the actuating knob 36. In this manner, the entire body of liquid, composed of liquid which was originally confined in the large container 1 and in the container 2, can enter the internal space 35 by way of the inlet 33 and can flush the internal space to be evacuated by way of the odor barrier 37 in a direction toward the drain pipe 38. During evacuation of the contents of the large container 1, the level 29 in the large container 1 descends with the float 27. Due to sinking of the float 27, the float-actuated valve 26 opens so that fresh fluid can enter the container 2 by way of the supply pipe 25. The container 2 is filled up to the level 45 which is determined by a sealing cylinder 46 constituting part of the valve 6.

When such level 45 is reached, the liquid 5 which continues to flow from the supply conduit 25 into the container 2 enters the large container 1 by way of an overflow 47. This overflow 47 is provided at the upper end of the sealing cylinder 46 so that the liquid 5 which flows from the container 2 by way of the overflow 47 can enter the large container 1 via sealing cylinder 6.

As the liquid in the large container 1 rises, the level 29 also rises. The float 27 which swims at this level 29 actuates the float-actuated valve 26 as soon as the large container 1 is filled. The float-actuated valve 26 seals the supply pipe 25 so that no additonal liquid 5 can enter the container 2.

Instead of an elbow 7, the liquid seal 3 can be constituted by a compartment 84 of the container 2. The compartment is subdivided into two smaller compartments by a partition 87. The partition 87 extends from the cover 24 in a direction toward the bottom 22 of the container, and that end 88 thereof which faces away from the cover 24 dips into the liquid 5 which extends to the overflow 47. The two smaller compartments communicate with each other below the end 88 when the level of liquid in the container 2 descends.

The outlet end 10 discharges into one of the two smaller compartments at a first location 85 which is disposed above the upper liquid level at the overflow 47, whereas the inlet end 9 communicates with the other smaller compartment at a second location 86 above the overflow 47. The compartment 84 is separated from the remaining internal space 90 of the container 2 by a wall 89 which extends from the cover 24 in a direction toward the container bottom 22 and the lower end 91 of which faces the container bottom 22 and terminates at a small distance thereabove so that this lower end 91 extends into the odor barrier 21. In this manner, one prevents penetration of the odors from the compartment 84 into the remaining internal space 90 of the container.

Instead of a single inlet end 9, it is also possible to provide two spaced apart inlet ends 48, 49 each of which communicates with the outlet end 10. Such connection can be disposed at a single level so that, when the liquid 5 in the container 2 descends, both inlet ends 48, 49 are simultaneously connected with the outlet end 10. It is conceivable, for example, to evacuate foul smelling odors not only through the hollow body 40 but also by way of the upper edge 50 of the toilet bowl 34 which faces away from the odor barrier 37 and through a non-illustrated discrete conduit.

It is also possible to have the inlet end 48 communicate with the outlet end 10 at a level 51 higher than the inlet end 49 which communicates at a level 52. In this manner, and when the level of liquid 5 in the container 2 descends, one establishes first a connection between the inlet end 48 and the outlet end 10.

A communication is established at the lower level 52 between the inlet end 49 and the outlet end 10 only when the liquid 5 in the container 2 continues to descend so that, at such time, odors are also drawn by way of the inlet end 49. Such connection between the inlet end 49 and the outlet end 10 by way of the lower level 52 can be established when a gas stream which is drawn through the inlet end 48 satisfies certain requirements, for example, when its enrichment with aromatic substances exceeds a preselected value. A descent of liquid 5 in the container 2 toward the lower level 52 takes place only when such condition is satisfied. In this manner, and when such condition is satisfied, the gas can be evacuated by way of both inlet ends 48, 49.

The liquid seal 3 can also be installed directly in the large container 1 so that it is possible to dispense with the container 2. In such embodiment of the invention, evacuation of gases by way of the inlet end 9 in a direction toward the outlet end 10 is accomplished by lowering the liquid level 29 in the large container 1 to such an extent that all of the liquid is evacuated from the liquid seal 3. To this end, the lowermost portion 17 of the liquid seal communicates directly with the large container 1 by way of the liquid outlet 18. Such liquid outlet 18 can discharge into the tubular nipple 19 the lower end 20 of which faces away from the liquid outlet 18 and discharges into the odor barrier 21 which is fixedly connected with the bottom wall 32 of the large container 1 and remains filled with a body of liquid subsequent to evacuation of the contents of the large container 1 by way of the flushing valve 30.

It is also possible to mount the liquid seal 3 in the interior of the large container 1 for up-and-down movement. In such embodiment, the elbow 7 is connected with the inlet end 9 and outlet end 10 by bellows 67, 68. These bellows 67, 68 are extended as at 69 when the liquid seal 3 is filled and are collapsed as at 70 when the liquid seal 3 is empty.

The outer side 71 of the elbow 7 which faces away from the inlet and outlet ends 9, 10 rests on floats 72, 73 which swim on the liquid 5 and are vertically movably mounted on guides 74, 75. The inner side 76 of the elbow 7 which is disposed opposite the outer side 77 is connected with a fixing device 78 which has a handle 77 extending above the cover 24 of the large container 1. This fixing device 78 consists essentially of a rod 79 which is fixedly connected with the handle 77 and the lower end 80 of which faces away from the handle 77 and is provided with a lock disposed in a tubular guide 81 and adapted to be pivoted so that it either locks or is released. The tubular guide 81 is fixedly connected with the inner side 76 of the elbow 7 and is guided in a sleeve 82 which surrounds the rod 79 and is fixedly connected to the cover 24. When the floats 72, 73 are held in their lower positions, the fixing device 78 automatically assumes its locked position.

The outer side 71 of the elbow 7 is traversed by the liquid outlet 18 which is connected with the tubular nipple 19 in the already described manner. The lower end 20 of the nipple extends into an odor barrier which is secured to the bottom wall 32 of the large container 1.

When the fixing device 78 is unlocked, the floats 72, 73 rise in the liquid 5 and lift the liquid seal 3 out of the liquid 5 so that the liquid 5 which was confined in the elbow 7 can be evacuated by way of the liquid outlet 18 in a direction toward and into the large container 1.

Upon evacuation of the elbow 7, the inlet end 9 is connected with the outlet end 10 by way of the blower 11 so that gases can be withdrawn from the pipe 8.

When the level 29 descends as a result of opening of the flushing valve 30, the floats 72, 73 descend with the liquid which issues by way of the liquid outlet 31 until the bellows 67, 68 assume their extended condition 69. In such condition, the fixing device 78 is locked so that the floats 72, 73 are prevented from rising when liquid 5 is again admitted into the large container 1 by way of the supply pipe 25. The liquid seal 3 is then locked below the level 29 and is filled with liquid 5 from the liquid outlet 18 to thereby seal the inlet end 9 from the outlet end 10.

If gas is to be drawn again through the pipe 8, the handle 77 is pivoted so that the fixing device 78 is released from its locked position. The floats 72, 73 are then free to rise in the liquid so that an evacuation of the contents of the liquid seal 3 can take place.

The float 72 is connected with a connecting rod 83 which establishes a connection with the float-actuated switch 12 in raised position of the liquid seal 3. In such raised position, the blower 11 is started by way of the float-actuated switch 12. The bellows 67, 68 are then held in their collapsed condition 70.

The apparatus for regulating the flow of gas streams can also be put to use for purposes other than in flushing devices for toilet bowls 34. For example, it is conceivable to draw a contaminated gas stream by way of one or more inlet ends 9, depending on the extent of contamination. Such apparatus consists essentially of a pipe 8 which is provided with an inlet end 9 and an outlet end 10 and a looped tubular portion 104. The looped tubular portion 104 is U-shaped and comprises a first leg 105 which is connected with the pipe 8 and a second leg 106 which is connected with the first leg by way of a yoke 107. The second leg 106 has an end 109 which discharges into an outlet 108 and allows for evacuation of liquid 5 flowing from the pipe 8.

On the other hand, the first leg 105 has an end 111 which faces away from the yoke 107 and discharges into a liquid collector 113 by way of a connecting pipe 112. The collector constitutes a vessel which can be filled with liquid 5 by way of an inlet 114. This inlet 114 is controlled by a valve 115 and, when necessary, is connected with or disconnected from a water main. The inlet 114 discharges into the lower part 117 of the liquid collector 113 by way of a spray head 118 which extends vertically upwardly. Immediately above this spray head 118, there is provided a cage 116 extending in the direction of flow of the liquid stream 119 which issues from the spray head 118. A ball 120 is vertically movably guided in the cage 116. The cage 116 has walls 121 which surround the ball 120 with a relatively small clearance 122.

The lower wall 123 of the cage 116 faces away from the spray head 118 and is closed by a bottom plate which is provided with an opening 124. This opening 124 is disposed directly in the spray range of the liquid stream 119 so that, as soon as it passes through the opening 124, the liquid stream can impinge upon the underside 125 of the ball 120 which faces toward the lower wall 123. The ball is then lifted in the direction of flow of the liquid stream 119 which issues from the spray head 118 and flows toward that, upper, wall 126 of the cage 116 which is disposed opposite the lower wall 123.

The ball 120 is adjacent this upper wall 126 under the influence of the liquid stream 119 and abuts a stop 127 which is connected with the upper wall 126, the stop being contacted by the upper side 128 of the ball which faces away from the underside 125. The upper wall 126 permits the liquid 5 to flow therethrough for example, by being provided with stellate webs. It is also possible to use an upper wall 126 in the form of a sieve.

The cage 116 is followed by a further cage 129, as considered in the direction of the inflowing liquid stream 119. The lower part 130 of the cage 129 faces the lower cage 116 and is permeable to the liquid 5. This lower part 130 supports a ball 131 the specific weight of which is similar to that of the ball 120 and corresponds substantially to the specific weight of the liquid 5. The upper cage 129 has sidewalls 132, 133 which resemble a cone and extend into an internal space 134 which is surrounded by the pipe 8. The inclination of the sidewalls 132, 133 is such that these sidewalls 132, 133 extend substantially at right angles to the direction 135 in which a gas stream flows through the pipe 8. The sidewalls 132, 133 extend into an elbow 136 which connects the inlet end 9 with the outlet end 10.

The sidewalls 132, 133 are provided with openings 137, 138 through which the gas stream flows from the inlet end 9 in a direction toward the outlet end 10. The cross-sections of these openings 137, 138 are smaller than the diameter of the ball 131 so that the portions 139, 140 of the ball 131 can fluidtightly seal the openings 137, 138.

The opening 124 for the ball 120 is designed in a similar manner so that the ball 120 fluidtightly seals the opening 124 when it abuts the lower wall 123.

When the pipe 8 is being filled in a manner as shown in FIG. 8, the valve 115 is open so that the liquid stream 119 enters the liquid collector 113 and the cage 116. It thereby lifts the ball 120 to such an extent that the opening 124 is exposed for entry of liquid 5 into the two cages 116, 129. In this manner, the liquid 5 can rise in each of the cages 116, 129 without obstruction. The liquid 5 which rises in the cage 129 presses the ball 131 into a free space 141 which is disposed between the through openings 137, 138 in the upper part of the cage 129 facing away from the cage 116. The ball 131 is held in this free space 141 in a stable position under the influence of the liquid stream 119 so that the liquid can flow along the lower side of the ball 131, which latter cannot seal the through openings 137, 138 in such position, and through the openings 137, 138 into the inlet end 9 and outlet end 10. In the region of the inlet and outlet ends 9, 10, the liquid fills the entire cross-section of the pipe 8 so that the liquid 5 which accumulates in the inlet end 9 and outlet end 10 constitutes a liquid seal which interferes with the flow of gas in the pipe 8 from the inlet end 9 into the outlet end 10.

The inlet and outlet ends 9, 10 are filled to a level 142 of the yoke 107 of the looped tubular portion 104. A sealing element 143 is open during filling of the pipe 8 with liquid 5 so that it permits air to flow from the space around the sealing element 143 into the yoke 107 by way of a tubular nipple 144.

In this manner, an air stream enters by way of the sealing element 143 so that a liquid stream 145 which flows through the looped tubular portion 104 if the value 115 is not closed in time can be directed through the second leg 106 and into the outlet 108. When the valve 115 is closed, the upper level 146 of liquid remains at the level of the yoke 107 without evacuation of liquid from the inlet and outlet ends 9, 10 by way of the looped tubular portion 104.

In order to evacuate fluid from the inlet and outlet ends 9, 10, the sealing element 143 is closed in a first step so that no additional air can enter the yoke 107. In the next step, liquid 5 is again admitted, for a short interval of time, by way of the valve 115 to enter the liquid container 113 so that the level 146 rises to such an extent that the entire yoke 107 is filled with liquid 5. When the yoke 107 is filled, the liquid is evacuated through the second leg 106 in a direction toward the outlet 108. By way of the end 109 of the second leg 106 which is disposed at a level below the end 111, the liquid flows from the liquid collector 113, and consequently from the inlet and outlet ends 9, 10, to enter the outlet 108. At such time, the liquid 5 can flow through the openings 137, 138 which are not sealed by the ball 131. The ball 131 descends in a direction toward the lower part 130 of the cage 129.

In order to prevent the ball 120 from entering the opening 124 and from sealing this opening from the liquid collector 113, the liquid stream 119 in the cage 116 causes the ball 120 to float. The liquid which at such time enters the liquid collector 113 is sucked out through the looped tubular portion 104 in the direction toward the outlet 108.

This liquid seal can be put to use with a pipe 8 which is maintained at an elevated or at a subatmospheric pressure. For example, if a subatmospheric pressure is generated in the outlet end 10, the ball 131 advances from the free space 141 in a direction toward the opening 138 so that its portion 139 extends through this opening. The ball thereby fluidtightly seals the opening 138 so that no liquid can be sucked from the outlet end 9 and from the cages 116, 129. If the inlet 114 admits a water stream 119 which impinges upon the ball 120, the latter is lifted away from the opening 124. At such time, the momentary position of the ball 120 is unimportant for the function of the liquid seal.

On the other hand, it is also conceivable to maintain the inlet end 9 of the pipe 8 at a superatmospheric pressure. Such superatmospheric pressure causes the ball 131 to advance from the free space 141 into the opening 138 so that the portion 139 thereof extends into the outlet end 10. In such position, the ball 131 seals the opening 138 so that the pressure cannot propagate itself into the outlet end 10. On the contrary, the pressure propagates itself into the cages 116, 129 and forces the ball 120 into the opening 124 of the cage 116. A portion of the ball 120 extends through this opening 124 so that the ball 120 establishes in the opening 124 a seal to prevent the propagation of pressure into the looped tubular portion 104. In this manner, the liquid remains in the inlet end 9 without being expelled in the outlet 108 by way of the looped tubular portion 104.

In principle, it is also possible to dispose the cages 116, 119 adjacent each other in a horizontal direction. In this embodiment, it is necessary to ensure that the liquid stream 119 flows through the cages 116, 129 in a horizontal direction.

A looped tubular portion 104 can be used to regulate a body 164 of liquid which is confined in a container 2. This container 2 is disposed in the interior of a flushing tank 166 which receives flushing water 167 serving to flush the toilet bowl 34. For this purpose, the flushing tank 166 is connected, by a flushing pipe 169, with the toilet bowl 34 the upper edge 50 of which communicates with the discharge end of the flushing pipe 169.

The latter is sealed from the flushing tank 166 by the flushing valve 30 which can be opened or closed by an actuating linkage 172. This actuating linkage is connected with the actuating knob 36 which extends from the flushing tank 166. Between the actuating linkage 172 and the flushing valve 30, there extends an overflow pipe 174 which is connected with the actuating linkage 172 on the one hand and with the flushing valve 30 on the other hand. The overflow pipe 174 is provided with overflow openings 176 disposed at the maximum achievable liquid level 175 in the flushing tank 166. The openings 176 permit flushing water 167 to enter the overflow pipe and flushing pipe. The overflow pipe constitutes an extension of the flushing pipe 169 and extends in a direction toward the actuating linkage 172.

In order to flush the toilet bowl 34, the actuating knob 36 is lifted to thus open the flushing valve 30. In this manner, the body of water which is confined in the flushing tank 166 can enter the toilet bowl 34 by way of the flushing pipe 169 and flush the bowl so that contaminated water 177 which has accumulated in the toilet bowl 34 can flow through the odor barrier 37 and into the drain pipe 38. The quantity of flushing water 167 which is available for such purpose can be increased by the body 164 of liquid which is confined in the container 2. For this purpose, the body 164 of liquid is flushed into the flushing tank 166 by way of the looped tubular portion 104. In order to initiate such admission of liquid, the entire looped tubular portion 104 is filled with water so that the body 164 of liquid enters the first leg of the looped tubular portion 104 and is sucked through the second leg 106 in a direction toward the flushing tank 166. The end 109 of this second leg 106 is disposed at a level below the end 111 of the first leg 105 which extends into the container 2.

The looped tubular portion 104 is filled with assistance from a filling device 180 which is connected with a non-illustrated water main by a supply conduit 181. This filling device 180 consists essentially of a spray pipe 182 the spray head 183 of which terminates immediately adjacent the end 111 of the first leg 105. Between the spray pipe 182 and the supply conduit 181, there is disposed a control valve 184 which has an actuating knob 185 extending from the container 2 and from the flushing tank 166. The control valve 184 can be opened by the actuating knob 185 so that water can flow from the supply conduit 181 into the spray pipe 182 and enter the end 111 by way of the spray head 183. The surge of pressure which is initiated by the actuating knob 185 expels the body of water, which was confined in the first leg 105, through the yoke so that water which was confined in the first leg 105 is brought into contact with the body of water which is confined in the second leg 106.

In this manner, the looped tubular portion 104 constitutes a water pump which conveys the entire body 164 of water from the container 2 into the flushing tank 166. Thus, the quantity of flushing water 167 in the flushing tank increases to reach the upper water level 175. It is then available for carrying out a large flushing operation.

The inlet end 9 and the outlet end 10 of the pipe 8 extend through the container 2. The elbow 136 extends into the body 164 of water in the container 2 so that it constitutes a liquid seal.

The inlet end 9 communicates with a ventilating conduit 187 by way of a connecting pipe 186. The ventilating conduit 187 extends through the flushing tank 166, and its upper end 188 terminates in a bell 190 above the lower liquid level 189 of the body 167 of flushing water in the flushing tank 166. This bell 190 has a bottom 191 which is open toward the ventilating conduit 187 and through which the upper end 188 of the ventilating conduit extends into the bell 190. The marginal portion 192 of the bell surrounds the open bottom 191 and extends into the body 167 of flushing water so that no gases can penetrate from the internal space 193 of the bell 190 into the flushing tank 166.

In this manner, it is possible to produce in the ventilating conduit 187, with assistance from subatmospheric pressure which is generated in the pipe 8 by the blower 11, a stream of foul smelling air which flows from the toilet bowl 34 in a direction toward the bell 190. Such air flows through the connecting pipe 186, into the inlet end 9 and thence into the outlet end 10 when the container 2 is evacuated. This stream of waste air is then conveyed by the blower 11 through the pipe 8 and into the drain pipe 38 which is connected with the pipe 8.

The open bottom 191 of the bell 190 permits the overflow openings 176 of the overflow pipe 174 to extend into the interior of the bell. Since this overflow pipe 174 extends beyond the lower level 189 and beyond the upper level 175 of flushing water 167, foul smelling air can flow from the toilet bowl 34 by suction through the overflow pipe 174 and the flushing pipe 169. This can be of advantage when the opening 195 at the lower end of the ventilating conduit 187 which extends into the toilet bowl 34 is clogged. In such instance, foul smelling air cannot be sucked away through the lower end 195 but must be withdrawn in the region of the upper edge 50 of the toilet bowl 34. Such evacuation at the upper edge 50 is not as effective for the evacuation of foul smelling air as that in the region of the lower end 195 but results, nevertheless, in the removal of a substantial percentage of the foul smelling air which develops in the toilet bowl 34.

The bell 190 (FIG. 10) can also serve as an active control element for the odor barrier. In this case, not only the inlet end 9 but also the outlet end 10 can extend through the bottom of the large container 1, which constitutes the flushing tank 166, and into the bell which can sink and is provided with the floats 172, 173. The cupola 178 of the bell 190 is provided with passages 179 through which the inlet end 9 and the outlet end 10 87 are sealingly guided in the lower position of the bell. In such position, the connection between the inlet end 9 and the outlet end 10 is interrupted. If the fixing device 78 which holds the bell 190 in its lower position is released, the bell 190 rises vertically along the guides 74, 75 and establishes a connection between the inlet end 9 and the outlet end 10. Upon actuation of the flushing valve 30, the body 167 of water which is contained in the flushing tank is free to escape, and the bell sinks again to assume its lower end position to which it is held by the fixing device 78.

The cupola 178 of the bell 190 contains the partition 87 which extends toward the water level 189 and is secured to the inner side of the cupola 178 which faces the water level 189. The inlet end 9 and the outlet end 10 extend upwardly above the water level 189 and into the interior of the bell 190. The partition 87 extends between the inlet end 9 and the outlet end 10 when the bell 190 is sunk and is held by the fixing device 78. The floats 172, 173 lift the bell 190 as soon as the fixing device 78 is disengaged. In this manner, the partition 87 is lifted above the water level 189. The path between the inlet end 9 and the outlet end 10 is then free between the partition 87 and the water level 189 in the interior of the bell 190.

The median portion 196 of the overflow pipe 174 between the flushing valve 30 and the overflow openings 176 has a constriction 197 of its cross section. This constriction 197 establishes in the overflow pipe 174 an intentionally increase in flow resistance so that a relatively small stream of water can flow in the overflow pipe 174 as compared with the ventilating conduit 187. This is intended to ensure that the major part of foul smelling air is withdrawn through the ventilating conduit 187 by way of its lower end 195. For this purpose, there is also provided a connecting member 198 which extends between the flushing pipe 169 and the ventilating conduit 187 and connects the latter with the flushing pipe 169. This connecting member 198 extends at an angle to the direction of the ventilating conduit 187 and is also inclined relative to the direction of the flow of foul air through the flushing pipe 169.

In this manner, one ensures that a portion of foul smelling air which enters by way of the lower end 195 is drawn through the flushing pipe 169 and into the bell 190. In addition, the connecting member 198 enables the body 167 of water to be flushed in part through the ventilating conduit 187 and into the toilet bowl 34. This quantity of the body 167 of flushing water which flows through the ventilating conduit 187 ensures a flushing of the ventilating conduit in the region of the lower end 195 so that the lower end is relieved of impurities which could have accumulated during withdrawal of foul air. In addition, owing to such direct entry of a portion of flushing water into the waste water 177, the syphon effect of the odor barrier 37 is enhanced considerably so that one ensures a much faster and more comprehensive rerinsing of the odor barrier 37 and of the drain pipe 38.

Prior to utilization of the toilet, the actuating knob 185 is pulled to actuate the control valve 184. Consequently, a quantity of water enters the end 111 of the first leg 105 by way of the spray head 183 and actuates the water pump which is constituted by the looped tubular portion. In order to prevent the transmission of pressure surges to the water main, the control valve 184 can be provided with a delay device 199 which establishes a delayed pressure surge in the filling device 180. In addition, it is possible to provide in the supply conduit 181 a pipe ventilator 165 which renders it possible to draw air into a quantity of water so as to actuate the water pump, which is constituted by the looped tubular portion 104, by way of the filling device 180.

The water pump conveys the body 164 of water into the flushing tank 166 so that the latter accumulates a body of flushing water which extends to the water level 175. After the water is evacuated from the container 2 by way of the control valve 184, the inlet end 9 communicates with the outlet end 10 by way of the elbow 136.

In addition, the float-actuated switch 12 starts the blower 11 so that the latter can draw foul air from the bell 190, and hence from the toilet bowl 34, by way of the outlet end 10, inlet end 9 and connecting pipe 186. The float-actuated switch 12 is operatively connected with the float 44 which swims on the body 164 of water and descends after evacuation of the body 164 of water by way of the looped tubular portion 104 to thereby close the float-actuated switch 12.

Upon completed use of the toilet, the actuating knob 36 is pulled out of the flushing tank 166 to thereby open the flushing valve 30. The body 167 of flushing water flows through this flushing valve 30 and out of the flushing tank 166 for the purpose of flushing the toilet bowl 34, and flushes the latter. As the water level 175 descends, the float 27 also descends and opens the filling valve 26 which is mechanically connected thereto. The valve 26 connects the supply pipe 25 with a non-illustrated water main. The pipe 25 extends into the container 2 and fills the latter with a body 164 of water. As soon as the container 2 has accumulated the body 164, water which has entered the container 2 by way of the pipe 25 flows out by way of an overflow pipe 160 and into the flushing tank 166 until the latter is filled to the lower level 189. As soon as this level 189 is reached, the float 27 actuates the filling valve 26 so that the valve seals the pipe 25 from the water main and thus prevents any further filling of the flushing tank 166. Furthermore, the float 44 rises on the body 164 of water and opens the float-operated switch 12 so that the blower 11 is turned off.

In order to prevent a filling of the container 2 while the toilet is in use, which could perhaps take place when the filling valve 26 is leaking and the container 2 receives a supply of water, the filling valve 26 comprises a drip outlet 161 which is directed toward the flushing tank 166. In this manner, one prevents a body of water which has passed through a leaky filling valve 26 from entering the container 2 and from filling the liquid seal between the inlet end 9 and the outlet end 10. Due to such positioning of the drip outlet 161, which is disposed vertically below the pipe 25, one ensures that a path for the flow of air between the inlet end 9 and the outlet end 10 exists during the entire interval of use of the toilet.

The upper end 162 of the overflow pipe 160 which extends into the container 2 must be disposed at a predetermined level below the yoke 107. In this manner, one prevents filling of the entire looped tubular portion 104 during filling of the container 2 with water and undesirable flow of water body 164 into the flushing tank 166 by way of the looped tubular portion 104 which acts as a water pump. For this reason, the upper end 162 must be disposed so far below the yoke 107 that the latter is not traversed by a flow of water during filling of the container 2.

Furthermore, it is necessary to ensure that the inlet end 9 is not entirely immersed in the body 164 of water in the container 2. On the contrary, it is desirable to provide between the connecting pipe 186 and the inlet end 9 an elbow 163 which extends above the upper end 162 of the overflow pipe 160.

In this manner, one prevents the outflow of water during filling of the container 2 through the inlet end 9 and the connecting pipe 186 into the flushing tank 166 and eventually into the ventilating conduit 187 before the container 2 is filled with water to the predetermined level. Furthermore, care should be taken to ensure that the elbow 163 is disposed above a plane which is determined by the yoke 107.

Instead of a looped tubular portion 104 which constitutes a water pump, the container 2 can be equipped with a pump 92 which conveys the body 164 of water into the flushing tank 166. If the container is subdivided into a first compartment 84 and a remaining inner space 90, the pump 92 can be provided in the first compartment 84 as well as in the remaining internal space 90.

I claim:

1. A toilet, comprising a toilet bowl having a waste discharge opening; a waste discharge line communicating with said bowl by way of said discharge opening; means for flushing waste from said bowl into said waste discharge line through said waste discharge opening, said flushing means including a flushing tank for a supply of flushing liquid and means for effecting discharge of flushing liquid into said bowl, said flushing tank having a pair of chambers; means for withdrawing air from said bowl including a pipe having an open first end in said bowl and a second end in said tank, an air duct having a first end portion in said tank and a second end portion opening into said waste discharge line, and blower means for conveying air from said bowl to the waste discharge line via said pipe and said duct; liquid seal means in one of said chambers between said second end and said first end portion, a body of the supply of flushing liquid being disposed in said liquid seal means; and means for establishing communication between said one chamber and the other of said chambers.

2. The toilet of claim 1, wherein said liquid seal means includes a tubular member having an air inlet end arranged to receive air issuing from said second end and an air outlet end arranged to discharge air into said first end portion.

3. The toilet of claim 1, wherein the body of flushing liquid in said one chamber has a height which is variable between a first level and a lower second level.

4. The toilet of claim 3, wherein said liquid seal means is designed to establish communication between said second end and said first end portion when the body of flushing liquid is at said second level.

5. The toilet of claim 3, wherein said liquid seal means is designed to block communication between said second end and said first end portion when the body of flushing liquid is at said first level.

6. The toilet of claim 1, wherein said liquid seal means includes a tubular member having an air inlet end arranged to receive air issuing from said second end and an air outlet end arranged to discharge air into said first end portion, said member being substantially U-shaped.

7. The toilet of claim 1, wherein said liquid seal means has an air inlet and an air outlet and a connecting portion connecting said air inlet and said air outlet to one another, said liquid seal means further including a liquid outlet disposed at a level no higher than said connecting portion.

8. The toilet of claim 1, said liquid seal means being provided with a liquid outlet; and further comprising means for evacuating liquid from said liquid seal means via said liquid outlet, said evacuating means including an evacuating member having a hollow first leg and a hollow second leg, and said first leg having a first upper end and a first lower end communicating with said liquid outlet, said second leg having a second upper end and a second lower end terminating no higher than said first lower end, and said evacuating member further comprising a hollow bridging portion between said upper ends.

9. The toilet of claim 8, wherein said evacuating means further includes a regulating element for regulating the air pressure in said evacuating member.

10. The toilet of claim 9, wherein said regulating element is mounted on said bridging portion.

11. The toilet of claim 8, further comprising a spray element directed towards said first lower end.

12. The toilet of claim 8, further comprising valve means for regulating the flow of liquid through said liquid outlet.

13. The toilet of claim 12, said liquid seal means including a tubular member having an air inlet end arranged to receive air issuing from said second end and an air outlet end arranged to discharge air into said first end portion; and wherein said valve means includes a first valve which is at least partially disposed in said tubular member and a second valve adjacent to said first lower end.

14. The toilet of claim 13, wherein each of said valves comprises a ball valve and each of said ball valves includes a ball having a specific weight which at least approximates that of said flushing liquid.

15. The toilet of claim 14, wherein said first valve includes a first cage for the respective ball and said second valve includes a second cage for the respective ball, said first cage being disposed directly above said second cage.

16. The toilet of claim 13, wherein said second valve has a seat intermediate said first lower end and said first valve.

17. The toilet of claim 13, wherein said first valve has a seat in said tubular member intermediate said air inlet end and said air outlet end, said seat being located nearer to said air outlet end than to said air inlet end.

18. The toilet of claim 1, wherein said liquid seal means is provided with a passage constituting both an inlet and an outlet for said body of flushing liquid.

19. The toilet of claim 1, further comprising an odor barrier in said one chamber, and means for admitting fresh flushing liquid into said one chamber, said liquid seal means being provided with a liquid outlet which communicates with said odor barrier.

20. The toilet of claim 1, further comprising means for admitting fresh flushing liquid into said one chamber, said communication establishing means comprising an overflow in said one chamber.

21. The toilet of claim 1, wherein said liquid seal means comprises a bent tubular member having a liquid outlet at the lowest point thereof.

22. The toilet of claim 1, wherein said first end portion opens into said one chamber at a first location and said second end opens into said one chamber at a second location, said communication establishing means comprising a passage in said one chamber for discharging liquid into the other of said chambers, said liquid seal means including a partition between said first and second locations, and said partition having a lower end extending downwards at most to the level of said passage.

23. The toilet of claim 22, said one chamber having a first portion and a second portion of lesser depth than said first portion, said first portion being provided with a bottom; and further comprising a wall in said first portion defining a gap with said bottom and dividing said one chamber into two compartments, said liquid seal means being located in one of said compartments and said passage being located in the other of said compartments.

24. The toilet of claim 1, further comprising means for evacuating liquid from said liquid seal means, said evacuating means including an evacuating member having a hollow first leg and a hollow second leg, and said first leg having a first upper end and a first lower end, said second leg having a second upper end and a second lower end, and said evacuating member further including a hollow bridging portion between said upper ends; and wherein said first lower end opens into the flushing liquid.

25. The toilet of claim 24, wherein said one chamber is provided with a bottom; and wherein said first lower end extends to the region of said bottom, said second lower end opening into the other of said chambers.

26. The toilet of claim 24, further comprising a spray element in said tank directed towards said first lower end, a valve in said tank for regulating the flow of liquid through said spray element, and a device for operating said valve, said device projecting from said tank.

27. The toilet of claim 1, further comprising a conduit for admitting fresh flushing liquid into said one chamber, a valve for regulating the flow of liquid through said conduit, and a drip outlet communicating with said valve, said drip outlet being disposed at a lower level than said conduit and opening into the other of said chambers.

28. The toilet of claim 1, further comprising a bell in said tank, said bell having a lower end; and wherein said liquid seal means has an air inlet communicating with the interior of said bell and said pipe extends through said lower end so that said second end is located in said bell.

29. The toilet of claim 28, wherein said bell is disposed in the other of said chambers; and further comprising means defining a maximum liquid level for said other chamber, said maximum liquid level being located at a height inside said bell and said second end terminating no lower than said maximum liquid level.

30. The toilet of claim 28, further comprising an overflow conduit which communicates with said toilet bowl, said overflow conduit extending into, and having an overflow opening in, said bell.

31. The toilet of claim 30, wherein said discharge effecting means includes a flushing conduit connecting said toilet bowl with said tank, a valve for regulating the flow of flushing liquid through said flushing conduit, and an actuating element for said valve projecting outwardly from said bell, said overflow conduit constituting an extension of said flushing conduit.

32. The toilet of claim 1, wherein said communication establishing means comprises a pump in said one chamber for pumping the body of flushing liquid into said other chamber.

33. The toilet of claim 1, said first end portion opens into said one chamber at a first location and said second end opens into said one chamber at a second location; and wherein said liquid seal means includes a partition between said first and second locations.

34. The toilet of claim 33, wherein said one chamber is substantially airtight.

35. The toilet of claim 33, wherein said second location is disposed at a level below said first location.

36. The toilet of claim 1, wherein said second end terminates below the level of the body of flushing liquid.

37. The toilet of claim 1, wherein said other chamber is arranged to accommodate a quantity of the flushing liquid, said communication establishing means comprising means for evacuating the body of flushing liquid from said one chamber and admitting such body into said other chamber.

38. The toilet of claim 37, wherein said evacuating and admitting means comprises a generally U-shaped tubular member having a first leg which opens into said one chamber and a second leg which opens into said other chamber; and further comprising a spray element arranged to direct a spray into said first leg.

39. The toilet of claim 1, further comprising means for admitting fresh flushing liquid into tank, and means for aerating the flushing liquid flowing through said admitting means.

40. The toilet of claim 1, said bowl having an upper marginal portion, and said liquid seal means having an air inlet; and further comprising an overflow conduit in said tank having one end in communication with said upper marginal portion and another end in communication with said air inlet.

41. The toilet of claim 40, wherein said pipe has a first cross-sectional area and said overflow conduit includes a section of second cross-sectional area smaller than said first cross-sectional area.

42. The toilet of claim 1, said discharge effecting means including a flushing conduit connecting said tank with said bowl; and further comprising a connecting duct connecting said pipe with said flushing conduit.

43. The toilet of claim 42, said pipe extending below said flushing conduit; and wherein said connecting duct has a downward inclination as considered in a direction from said tank to said bowl.

44. The toilet of claim 42, said bowl having an upper marginal portion and a lower portion; and wherein said open first end is located in said lower portion, said flushing conduit having an open end at said upper marginal portion.

45. The toilet of claim 42, wherein said connecting duct is arranged to direct flushing liquid from said flushing conduit into said pipe.

46. The toilet of claim 42, said flushing conduit having a first cross-sectional area; and wherein said connecting duct has a second cross-sectional area smaller than said first cross-sectional area.

47. The toilet of claim 1, said bowl having a lower portion; and wherein said open first end is located in said lower portion.

* * * * *